United States Patent
Hamilton et al.

(10) Patent No.: US 10,375,547 B2
(45) Date of Patent: Aug. 6, 2019

(54) LOW POWER DEVICE CONFIGURATION

(71) Applicant: Hewlett-Packard Development Company, L.P., Houston, TX (US)

(72) Inventors: David O Hamilton, Ramona, CA (US); Alan C Berkema, Granite Bay, CA (US)

(73) Assignee: Hewlett-Packard Development Company, L.P., Spring, TN (US)

( * ) Notice: Subject to any disclaimer, the term of this patent is extended or adjusted under 35 U.S.C. 154(b) by 0 days.

(21) Appl. No.: 15/519,623

(22) PCT Filed: Feb. 19, 2015

(86) PCT No.: PCT/US2015/016613
§ 371 (c)(1),
(2) Date: Apr. 17, 2017

(87) PCT Pub. No.: WO2016/133520
PCT Pub. Date: Aug. 25, 2016

(65) Prior Publication Data
US 2017/0332188 A1 Nov. 16, 2017

(51) Int. Cl.
*H04W 4/50* (2018.01)
*H04W 4/80* (2018.01)
(Continued)

(52) U.S. Cl.
CPC ............ *H04W 4/50* (2018.02); *H04B 5/0031* (2013.01); *H04B 5/0056* (2013.01); *H04W 4/80* (2018.02);
(Continued)

(58) Field of Classification Search
CPC ............... H04W 4/80; H04W 52/0219; H04W 52/0229; H04W 52/0296
(Continued)

(56) References Cited

U.S. PATENT DOCUMENTS 5,515,087 A 5/1996 Lim et al.
5,960,167 A 9/1999 Roberts et al.
(Continued)

FOREIGN PATENT DOCUMENTS

| EP | 1212194 | 2/2007 |
|---|---|---|
| JP | 2012109790 | 6/2012 |
| KR | 20110020939 | 3/2011 |

OTHER PUBLICATIONS

Amadeus, "Configure Broadcast Printer," (Web page), 2014, 2 pages, http://install.amadeusschweiz.com/en/.
Gomez, C. et al., "Overview and Evaluation of Bluetooth Low Energy: An Emerging Low-Power Wireless Technology," Sensors 2012, 12, 11734-11753, Aug. 29, 2012.

*Primary Examiner* — Shaima Q Aminzay
(74) *Attorney, Agent, or Firm* — HP Inc. Patent Department (57) ABSTRACT

Techniques for systems, methods, and devices for configuring an electronic device for use by a particular end-user. The electronic device can include a low power wireless communication device that transmits a periodic or occasional low power wireless beacon signal. A user operating a computing device within the proximity of the electronic device can detect the beacon signal and establish a corresponding low power wireless communication session. The computing device can then transmit configuration settings specific to the electronic device through the low power wireless communication session to the corresponding low power wireless communication device. The configuration data can be stored in a memory on the low power wireless medication device. When the electronic device coupled to the low power wireless communication device is powered up, it can access the configuration data stored in the memory.

19 Claims, 7 Drawing Sheets

(51) Int. Cl.
*H04B 5/00* (2006.01)
*H04W 8/00* (2009.01)
*H04W 84/18* (2009.01)

(52) U.S. Cl.
CPC ........... *H04W 8/005* (2013.01); *H04W 84/18* (2013.01); *Y02D 70/00* (2018.01); *Y02D 70/142* (2018.01); *Y02D 70/144* (2018.01); *Y02D 70/162* (2018.01); *Y02D 70/42* (2018.01)

(58) Field of Classification Search
USPC .................................................. 455/422, 522
See application file for complete search history.

(56) References Cited

U.S. PATENT DOCUMENTS

| | | | |
|---|---|---|---|
| 7,752,345 B2 | 7/2010 | Duckett | |
| 2003/0195952 A1 | 10/2003 | Henry et al. | |
| 2009/0237725 A1 | 9/2009 | Hamaguchi | |
| 2010/0220350 A1 | 9/2010 | Faridi | |
| 2012/0115540 A1* | 5/2012 | Kurose | H04B 1/3805 455/525 |
| 2015/0036002 A1* | 2/2015 | Yoshida | H04N 1/00347 348/207.2 |
| 2015/0098375 A1* | 4/2015 | Ree | H04W 52/0296 370/311 |

* cited by examiner

FIG. 7

LOW POWER DEVICE CONFIGURATION

BACKGROUND

Electronic devices are sold individually and in groups. In sales of groups of devices, the devices can be configured or programmed according to the specific needs or requirements of the customer. For example, a large enterprise customer might order a large number of network enabled printers for use in a particular location or on a particular network. In order to ensure the device conforms to its security policies, usage policies, or network configuration, the customer may request that the printers be delivered preconfigured and setup ready to operate in its business environment. Such settings may include network passwords, encryption codes, business-specific default print settings, wireless connectivity enabled or disabled and naming conventions. The customer requested configuration can differ from the default settings with which the printers are manufactured.

DETAILED DESCRIPTION

Overview

The present disclosure describes techniques for systems, methods, and devices for configuring a primary electronic device, such as a printer, a wireless network device, an automated controller, and the like, equipped with a low power wireless communication device. In various example implementations, the low power wireless communication device, using an internal power source (e.g., a battery), can transmit a periodic or occasional low power beacon signal. The low power beacon signal can include various indications regarding the identity and/or configuration state of the primary electronic device or the low power wireless communication device. For example, the low power beacon signal can include a serial number or Universally Unique Identifier (UUID) and a corresponding indication that the primary electronic device is currently configured with a set of default settings. A computing device, such as a handheld computer, smartphone, tablet computer, or the like, can execute an application to detect the low power beacon signal using a compatible receiver or transceiver. Based on the type or content of the low power beacon signal, the computing device can establish a connection with the low power wireless communication device. Once the connection is established, the computing device can send a command to store a set of configuration settings.

In response to the command to store the configuration settings, the low power wireless communication device can store the configuration settings in a local nonvolatile memory, such as flash memory or electrically erasable programmable read-only memory (EEPROM). The communication session between the computing device and the low power wireless communication device can be established and the configuration settings can be stored to the local memory without powering up the primary electronic device. Accordingly, the primary electronic device can be configured without external power, or even while packaged for shipment or delivery. When the primary electronic device is unpacked and powered, it can query the low power wireless communication device to determine if it contains configuration settings. If configuration settings are found in the low power wireless communication device, the primary electronic device can configure itself according to the settings.

Figure 1:
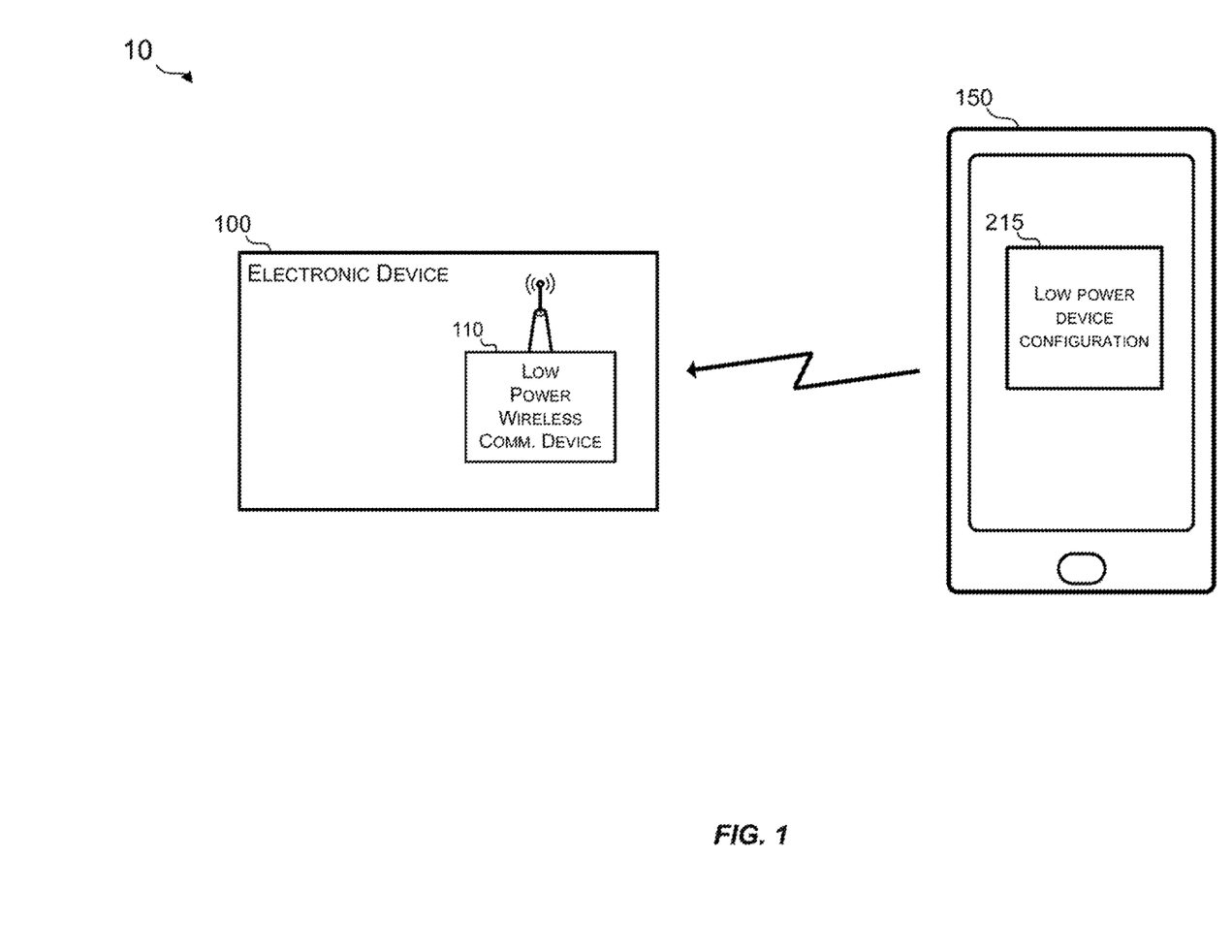
FIG. 1 illustrates an example schematic diagram of a system for low power device configuration.

FIG. 1 depicts a schematic of a system 10 for configuring electronic device 100 using computing device 150 and, an embedded low power wireless communication device 110. As shown, electronic device 100 can include the low power wireless communication device 110. In some implementations, the low power wireless communication device 110 may be permanently or temporarily coupled to the electronic device 100. For example, the low power wireless communication device 110 can include or be implemented in an application specific integrated circuit (ASIC) coupled to the internal electronics of the electronic device 100. In other example implementations, the low power wireless communication device 110 can be implemented as a stand-alone device compatible with an external or internal port of the electronic device 100. For instance, the low power wireless communication device 110 can be implemented in the form factor of a memory card (e.g., PC card, CompactFlash, SmartMedia, memory stick, secure data (SD) card, etc.), a universal serial bus (USB) dongle, or the like.

In various implementations, the low power wireless communication device 110 can include functionality for establishing wireless personal area network type communications. For example, the low power wireless communication device 110 can include functionality implemented as hardware or a combination of hardware (e.g., processor(s)) and machine-readable instructions executable by the hardware to communicate with other correspondingly enabled devices using various open and proprietary communication protocols (e.g. IEEE 802.15, Bluetooth low energy, wireless USB, ZigBee, Z-Wave, etc).

The computing device 150 can include functionality, implemented as hardware or a combination of hardware and machine-readable instructions executable by the hardware, for low power device configuration, represented here as instructions for low power device configuration 215 stored in a memory or executed by a processor. The examples of the specific functionality of the low power device configuration 215 are described in more detail herein.

Figure 2:
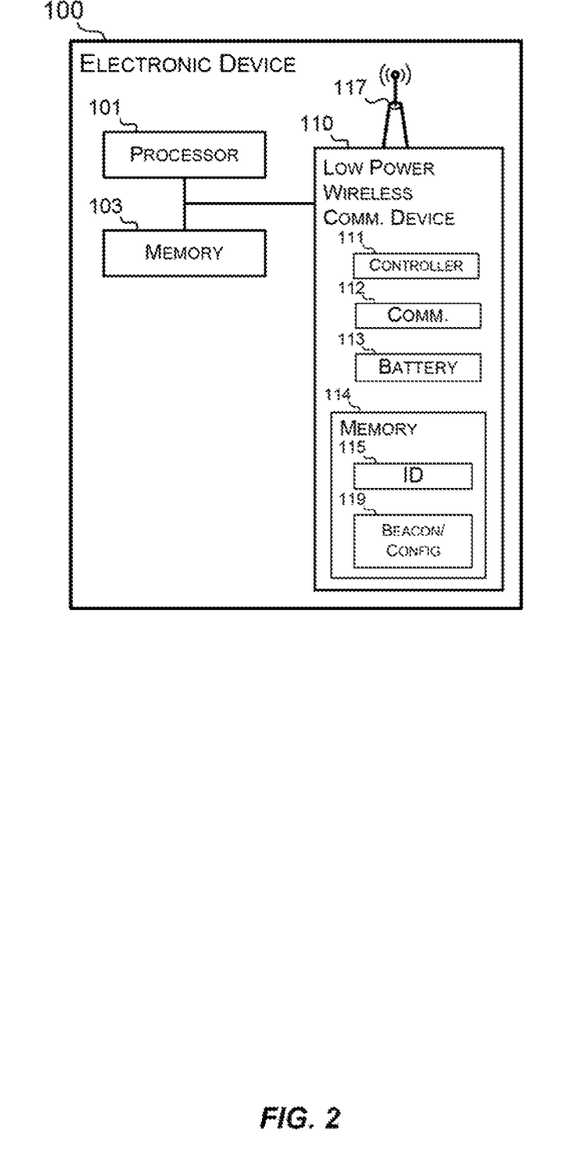
FIG. 2 illustrates schematic diagram of an example electronic device that includes an example low power wireless communication device.

FIG. 2 depicts a schematic of electronic device 100 and low power wireless communication device 110. As described herein, electronic device 100 can be any type of consumer, commercial, and industrial device capable of being individually configured according to predetermined or dynamically determined specifications. For example, the electronic device 100 can include network enabled printer that can be configured with default print settings and/or network communication settings to work in a particular office environment and according to the policies of the business.

As shown in FIG. 2, the electronic device 100 can include a processor 101 and a memory 103. The memory 103 can include any memory described herein. For example, memory 114 can include any type of volatile (transitory) or nonvolatile (non-transitory) computer readable medium, such as flash memory, solid-state drives (SSD), EEPROM, dynamic read-only memory (DRAM), static read-only memory (SRAM), and the like. As such, memory 103 can include instructions executable by the processor 101 to implement the functionality of electronic device 100. For example, in scenarios in which the electronic device 100 is a printer, memory 103 can include executable code or settings comprising instructions executable by the processor 101 to perform print operations.

In implementations in which the electronic device 100 is coupled to a low power wireless communication device 110, the processor 101 may also access the internal memory 114 of the low power wireless communication device 110. In such implementations, memory 114 can include configuration settings stored by the low power wireless indication device 110 according to the present disclosure. In some implementations, the processor 101 can execute general electronic device operations (e.g., print operations in a printer), however, the processor may also be specialized. In such implementations, the processor 101 can be a special purpose low power processor used for performing configuration operations.

As illustrated in FIG. 2, the low power wireless communication device 110 can include various sub components. In some examples, the low power wireless communication device 110 can include a controller 111, the communication interface 112, a battery or power source 113, a memory 114, and/or an antenna 117. The controller 111 can include a general purpose processor, an ASIC, a microcontroller, or any other analog or digital logic for performing the functionality of the low power wireless communication device 110 described herein. The communication interface 112 can include functionality for generating electronic messages and signals based on instructions from the controller 111 for wirelessly communicating with other devices. In such examples, the communication interface 112 can be coupled to the antenna 117 to transmit the electronic signals according to various wireless communication protocols. The battery 113 can include any type of stored power device, such as a coin cell battery, a super capacitor, and the like. The battery 113 can be coupled to any other component to power the functionality of the low power wireless communication device 110 described herein. Accordingly, the low power wireless communication device 110 can function without the electronic device 100 being powered by an external power source. The standalone capability of the low power wireless communication device 110 can provide for the low power configuration of the electronic device 100 even while the electronic device 100 is unplugged from electrical power and/or packaged.

Memory 114 can include any memory described herein. For example, memory 114 can include any type of volatile (transitory) or nonvolatile (non-transitory) computer readable medium, such as flash memory, solid-state drives (SSD), EEPROM, dynamic read-only memory (DRAM), static read-only memory (SRAM), and the like. Memory 114 can store executable code and/or configuration settings that the other components of the low power wireless communication device 110 can execute or reference to perform the functionality of the low power wireless communication device 110. For example, the controller 111 or processor 101 can execute instructions, such as beacon/configuration instructions 119, stored in the memory 114. The operations defined in the beacon/configuration instructions 119 can cause the lower power wireless communication device 110 to occasionally or periodically generate and transmit a beacon signal using the communication interface 112 and antenna 117. The beacon/configuration instructions 119 can cause the lower power wireless communication device 110 to receive a request message signal from an external computing device, such as computing device 150, and respond with a response message signal or establish a low power wireless communication session.

During the low power wireless communication session, the beacon/configuration instructions 119 can define operations for the controller 111 or processor 101 to exchange information with the computing device 150. Such information can include configuration settings that the processor 101 can use and/or store in the memory 103 for the operation of the electronic device 100. Accordingly, the beacon/configuration instructions 119 can define operations for storing the configuration setting to the memory 114 or memory 103. When the electronic device 100 is activated (e.g., powered and booted-up), the processor 101, according to computer executable instructions stored in the memory 103, can retrieve the configuration settings and perform various other operations (e.g., print operations, networking operations, control operations, etc.).

The memory 114 can store an identifier 115 associated with the specific low power wireless communication device 110 and/or electronic device 100. The memory 114 can also store a status flag or bit that indicates whether the memory 114 contains no additional configuration settings, factory default configuration settings, or previously reprogrammed configuration settings. Accordingly, the identifier 115 and/or the status bit can be transmitted in the beacon signal and used in the operations defined in the beacon/configuration instructions 119.

While the components of the low power wireless communication device 110 are illustrated as being individual components, the functionality of any of the components can be combined with any other of the components without departing from the spirit or scope of the present disclosure. For example, the functionality of controller 111, communication interface 112, and memory 114 can be combined into an ASIC. Alternatively, the functionality of the components of a low power wireless communication device can be implemented as hardware or a combination of hardware and machine-readable instructions executable by the hardware.

Figure 3:
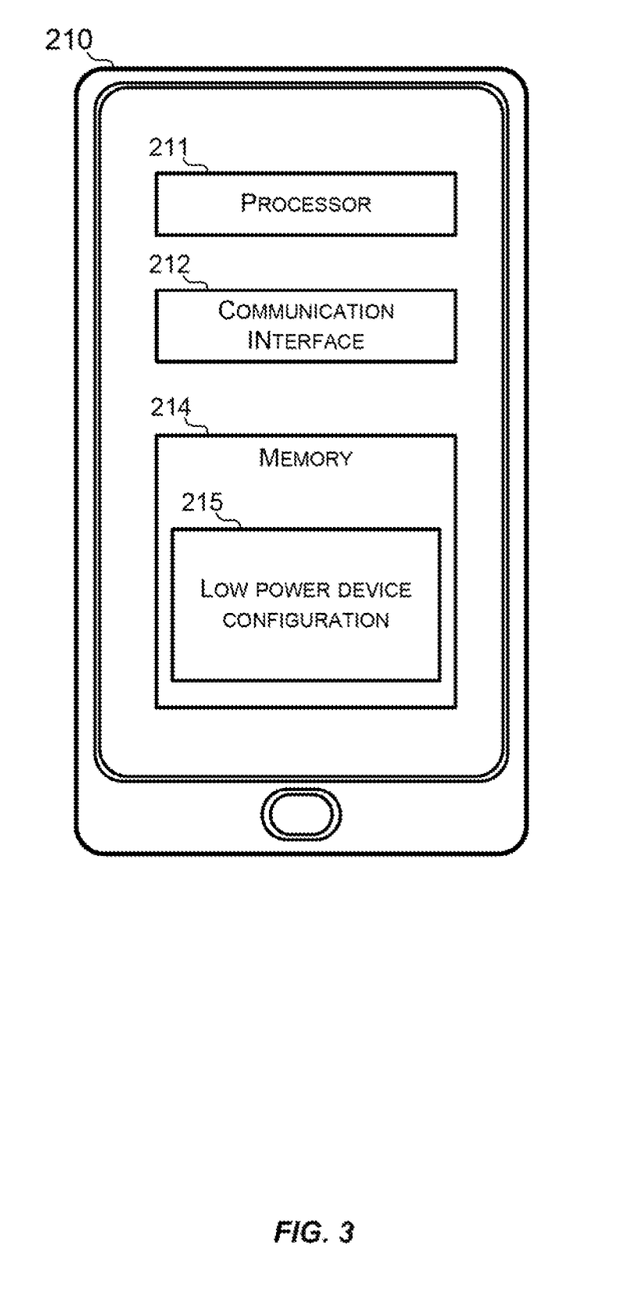
FIG. 3 illustrates an example computing device.

FIG. 3 depicts a computing device 210 that can be used to communicate with and configure an electronic device 100 through a corresponding low power wireless communication device 110. While the computing device 210 is depicted as being a tablet computer or smart phone, it can be in any form factor that can include the various components and functionality described herein. Accordingly, the computing device 210 can also be a desktop computer, laptop computer, a personal digital assistant, or other handheld computing device.

The computing device 210 can include a processor 211, the communication interface 212, and a memory 214. The processor 211 of the computing device 210 can include any general-purpose or application-specific processor. The memory 214 can include any volatile or nonvolatile computer readable medium, such as flash memory, a hard drive, SSD, EEPROM, DRAM, SRAM, and the like. The communication interface 212 can include any implemented as hardware or a combination of hardware and machine-readable instructions executable by the hardware for generating wireless communication signals according to various communication protocols. For example, communication interface 212 can include functionality for generating electronic messages and signals based on instructions from the processor 211 for wirelessly communicating with other devices, such as the low power wireless communication device 110. In such examples, the communication interface 212 can be coupled to an antenna (not shown) to transmit the electronic signals. Electronic signals can be generated in accordance with wireless personal area network type communication protocols, such as IEEE 802.15, Bluetooth low energy, wireless USB, ZigBee, Z-Wave, and the like.

The processor 211 can execute instructions stored as executable code or instructions in the memory 214 to perform the functionality of the computing device 210 described herein. For example, the processor 211 can execute low power device configuration instructions 210 stored in the memory 214 to establish a communication session with a low power communication device 110 through the communication interface 212 and transmit settings to be stored in the memory 114.

While not, shown, computing device 210 can also include a user interface device that includes functionality for outputting information to a user and receiving user input. For example, the user interface device can include a combination of a display, a keyboard, a touchpad, physical buttons, a touchscreen, or other user input device. For example, the computing device 210 implemented as a tablet computer can display an icon representing an executable application that a user can select to run to implement the functionality of the low power device configuration instructions 215.

Figure 4:
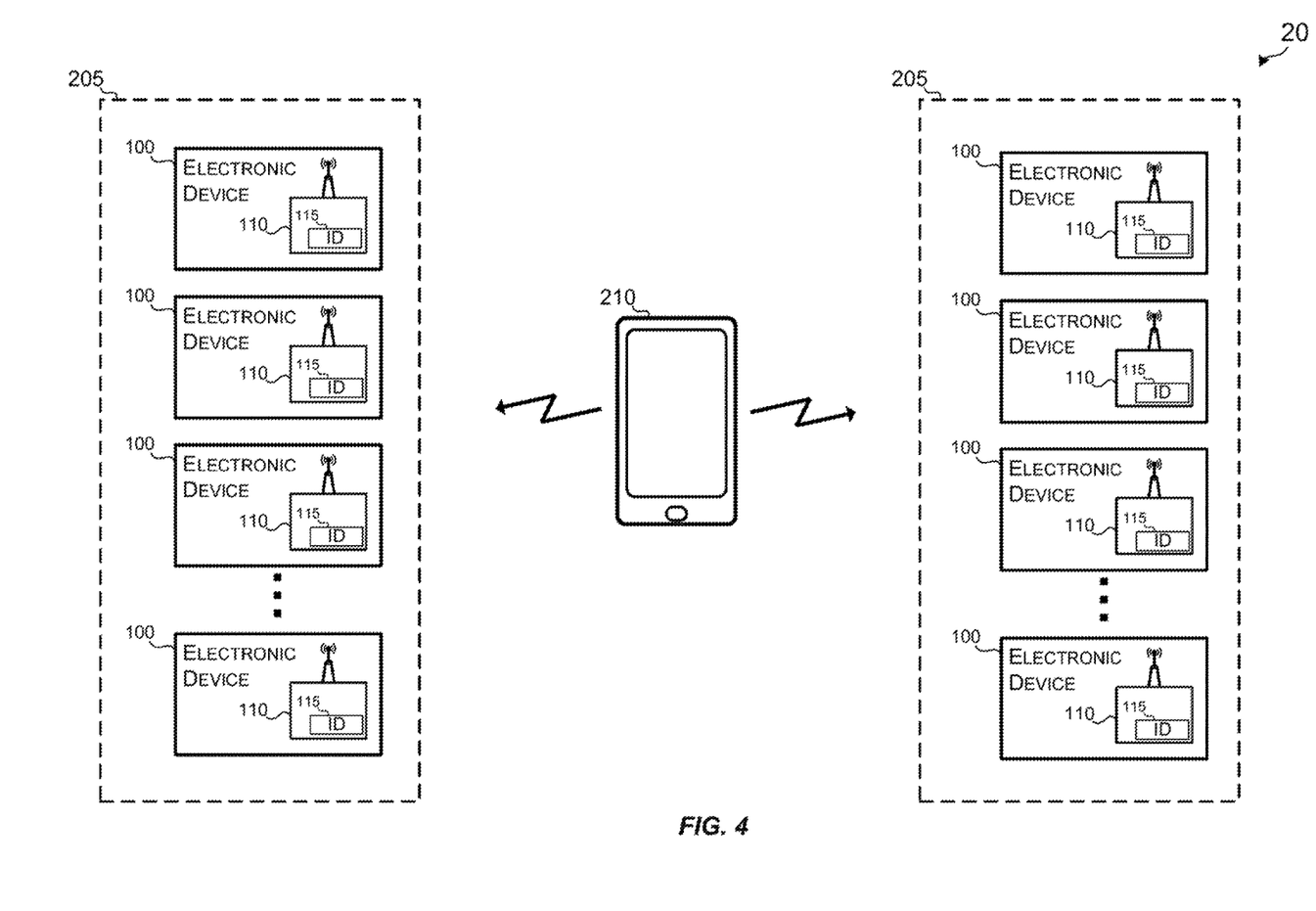
FIG. 4 illustrates an example low power configuration of multiple electronic devices.

FIG. 4 depicts a schematic of a system 20 for configuring multiple electronic devices 100 through corresponding wireless communication devices 110 using computing device 210. According to example implementations described herein, wireless communication devices 110 can each include a battery 113. As such, each of the wireless communication devices 110 can operate independently of whether electronic device 100 is powered or activated. Using such implementations, configuration settings can be provided to the wireless communication devices 110 even though the corresponding electronic devices 100 are contained in the packaging, unpowered, and ready for shipment. In some examples, this can enable configuration of settings specific to an intended user to be installed without unpackaging, powering on, or physically connecting each electronic device 100 to the computing device 210. Such implementations can reduce the number of steps, and thus increase the speed with which electronic devices 100 can be specially configured for, processed, and shipped to a particular end-user.

As illustrated, electronic devices 100 can be processed and configured in batches 205. For example, a batch 205 can represent a pallet worth of packaged electronic devices 100. To configure the electronic devices 100, a user using computing device 210 can move into the proximity of the batch 205. When within a range of the batch 205, the computing device can begin executing the instructions for low power device configuration. In some implementations, low power device configuration can include detecting multiple low power beacon signals transmitted by corresponding low power wireless communication devices 110 within the electronic devices 100.

As described herein, the low power wireless communication devices 110 can include an identifier 115. In some implementations, the identifier 115 is unique to the corresponding low power wireless medication device 110 and/or electronic device 100. In other implementations, the identifier 115 can include a batch number, model number, build number, or other identifier that associates the low power wireless communication devices 110 and/or electronic devices 100 with a particular batch 205. In some examples, the identifier 115 can also include a status indicator regarding the current configuration status of the low power wireless communication device 110 and/or the electronic device 100. The beacon signals transmitted by the low power wireless communication devices 110 can include the identifier 115 which can include various information regarding the current state of the low power wireless communication device 110 and/or the electronic device 100.

For each detected low power beacon signal, the computing device 210 can establish a low power wireless communication session with the corresponding low power wireless communication device 110. During the low power wireless communication session, the computing device 210 can transmit various commands. For example, the computing device 210 can transmit a command or signal that includes configuration settings specific to the corresponding electronic device 100. Transmission of the configuration settings can include a command to store the configuration settings in the memory 114 of the low power wireless communication device 110. In some implementations, the computing device 210 can transmit a command to the low power wireless communication device 110 to change the corresponding beacon signal. For example, such a command can include instructions to cease transmitting the beacon signal or update the status indicator (e.g., from "un-configured" to "configured"). When the computing device 210 has completed transmitting commands to the low power wireless communication device 110, it can end the low power wireless communication session and establish a low power wireless communication session with another low power wireless communication device 110 that is still transmitting a beacon signal. In this way, the computing device 210 can establish a low power wireless communication session with and transmit configuration settings to each low power wireless communication device 1113 the electronic devices 100 and a particular batch or group 205.

As described herein, the group 205 can be defined by the physical proximity of the electronic devices 100 in a particular area. For example, the group 205 can be defined by a particular set of electronic devices 100 packed and bundled on a pallet that's ready for shipment. In other implementations, the group 205 can be defined by a range of identifiers 115. For example, identifiers 115 can include corresponding unique serial numbers or media access control (MAC) addresses. The computing device 210 can thus only establish low power wireless communication sessions and transmit corresponding configuration settings to the low power wireless communication devices 110 with identifiers 115 within the predetermined range. In such implementations, it is possible to batches 205 (e.g., one pallet of printers being prepped to be delivered to customer A and another pallet of printers being prepped to be delivered to customer B) to be in close proximity to one another without interfering with the corresponding configurations.

Figure 5:
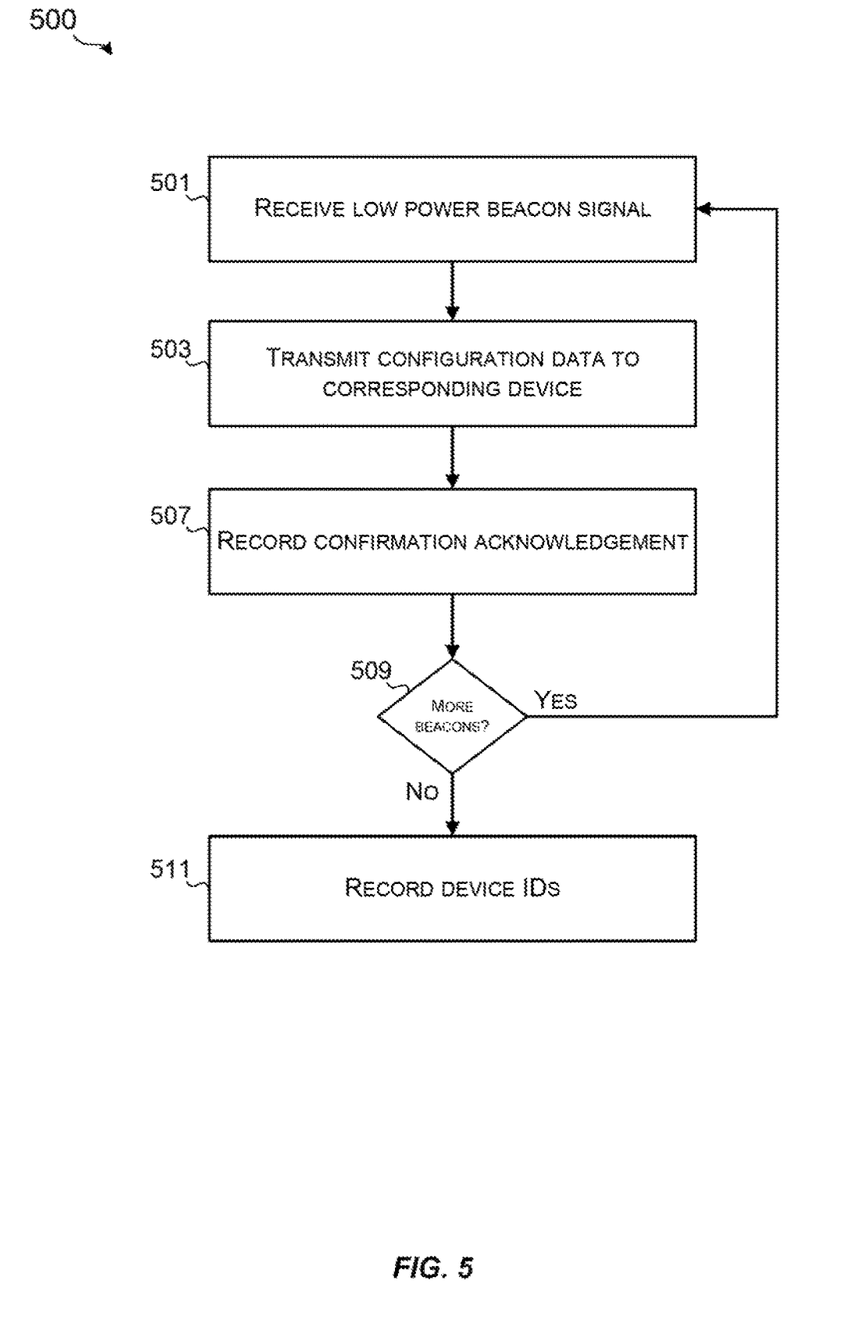
FIG. 5 is a flowchart of an example method for low power configuration of an electronic device using a computing device.

FIG. 5 depicts a flowchart of an example method 500 for using a computing device 210 to configure a particular electronic device 100 coupled to a corresponding low power wireless communication device 110. As shown, method 500 can begin at box 501, in which the computing device can receive a low power beacon signal. As described herein, the presence of the beacon signal can indicate that the transmitting low power wireless communication device 110 is configured or does not contain additional configuration settings different from configuration settings stored in the corresponding electronic device 100. Alternatively, the beacon device can include other information, such as configuration state or identifier 115 that the computing device can use to identify the transmitting low power wireless communication device 100 or the corresponding electronic device 100.

At box 503, the computing device 210 can transmit configuration data to the corresponding low power wireless communication device 110 transmitting the detected beacon signal. The configuration data can include configuration settings and/or commands that the low power wireless communication device 110 can use to store the transmitted configuration data in the corresponding memory 114. In some example implementations, once the low power wireless communication device 110 has successfully stored the transmitted configuration data, it can send a confirmation acknowledgment indicating the configuration data was successfully received and committed to memory. Accordingly, at box 507, the computing device 210 can record the confirmation acknowledgment. In some implementations, the confirmation acknowledgment can be associated with an identifier 115 associated with the low power wireless communication device 110 and/or the corresponding electronic device 100. In such implementations, the computing device 210 can use the record of the confirmation acknowledgment to determine that that particular electronic device 100 has already been configured and to avoid repeating the configuration process with that device.

At determination 509, the computing device 210 can determine whether more beacon signals are present. Determining whether more beacon signals are present can include simply detecting a beacon signal. Alternatively, detecting whether any more beacon signals are present can include determining an identifier 115 in the beacon signal and analyzing it for configuration state indicators or comparing it against a record of the received confirmation acknowledgments. If more beacon signals are present, then the computing device 210 can repeat boxes 501 through 507 until it determines at determination 509 that no more beacon signals are present.

When no more beacon signals are present, computing device 210 can record the device identifiers 115 all the low power wireless communication devices 110 and/or the corresponding electronic devices 100 that received configuration data. In one implementation, recording the identifiers 115 can include updating a database or enterprise system that the electronic devices 100 associated with the identifiers 115 are ready for shipment.

Figure 6:
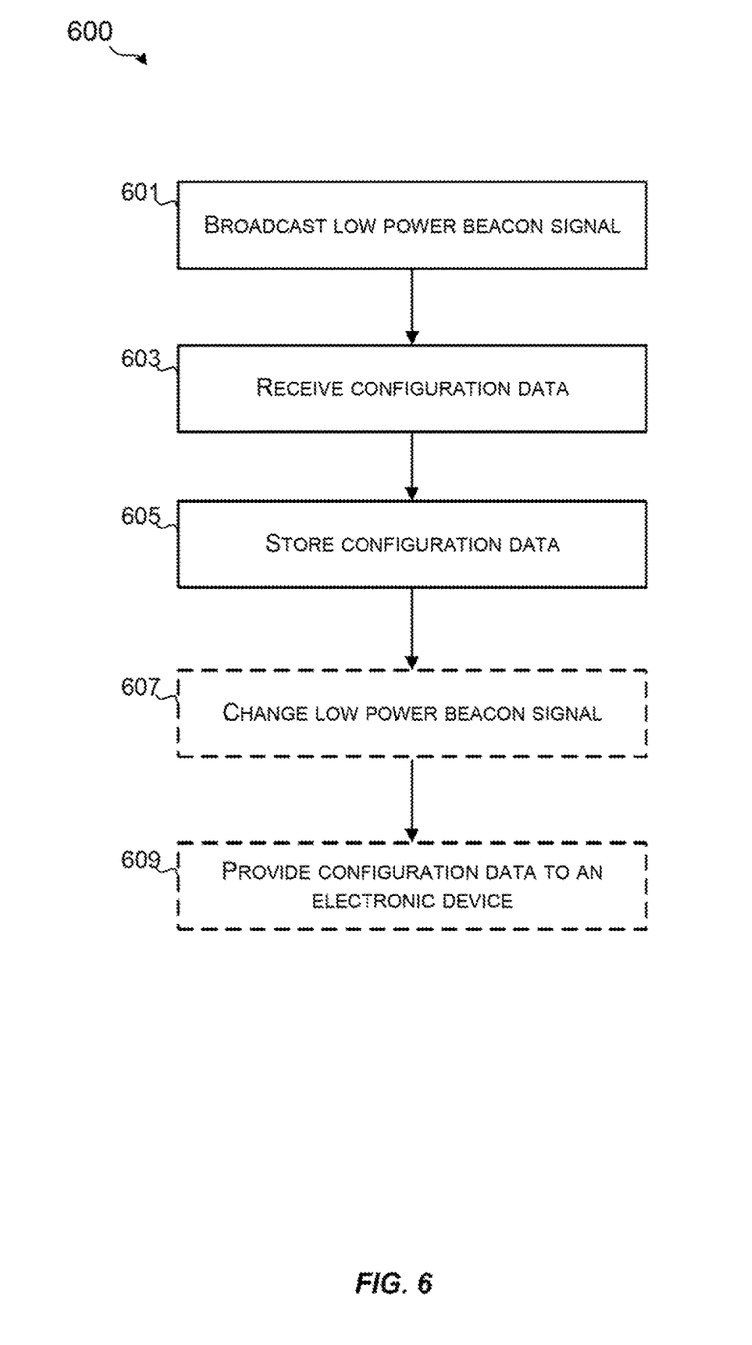
FIG. 6 is a flowchart of an example method for configuring an low power communication equipped device.

FIG. 6 is a flowchart of a method 600 for configuring an electronic device 100 using a corresponding low power wireless communication device 110. As described herein, method 600 can be implemented as a implemented as hardware or a combination of hardware and machine-readable instructions executable by the hardware. For example, method 600 can be implemented as beacon/configuration instructions 119. In some implementations, method 600 can begin at box 601, in which the low power wireless communication device 110 can broadcast a low power beacon signal. As described herein, low power beacon signal can include an identifier 115 and/or other indications of the configuration state of the low power wireless communication device 115 and/or the corresponding electronic device 100. In various implementations, the low power wireless communication device 110 can transmit the beacon signal periodically or occasionally. For example, the low power wireless communication device 110 can broadcast the low power beacon signal once every 10 seconds. The rates at which the low power beacon signal is transmitted can depend on the available power in the battery 113 and/or the desired shelf life of the low power wireless communication device 110.

At box 603, the low power wireless communication device 110 can receive configuration data. Accordingly, in example implementations, the low power wireless communication device 110 can receive the configuration data from a computing device 210 during a low power wireless communication session. Accordingly receiving the configuration data can include establishing a low power wireless communication session with the computing device 210. As used herein, the terms "configuration settings" and "configuration data" refer to any information that an electronic device 100 or low power wireless communication device 110 can use to define, customize, or set the various corresponding operations.

At box 605, the low power wireless communication device 110 can store the configuration data in a corresponding memory 114. Once the configuration data is stored in the memory 114, the low power wireless communication device 110 can send a confirmation acknowledgment back to the computing device 210 to confirm receipt and successful storage of the configuration data. In some implementations, method 600 can stop at box 605. However, in other example implementations, method 600 can continue to perform additional operations described herein. For example, method 600 can also include the operations described in reference to boxes 607 and 609.

At box 607, the low power wireless communication device 110 can change the low power beacon signal. As described herein, changing the low power beacon signal can include ceasing to transmit the low power beacon signal, or changing the content of the low power beacon signal. For example, the low power wireless communication device 110 can change the low power beacon signal to include a "configured" flag to indicate to the computing device 210 that it has previously received configuration data. In some implementations, a user may wish to reconfigure a particular electronic device 100 without powering it on. In such implementations, the computing device can search for low power beacon signals with configured flags and establish corresponding low power wireless communication sessions with the corresponding low power wireless communication devices 110 to transmit new configuration data.

At box 609, the low power wireless communication device 110 can provide the configuration data to electronic device 100. For example, when the electronic device 100 is unpacked, installed, and/or powered on by the end-user, electronic device 100 can access the low power wireless communication device 110 to which it is coupled to check if configuration data is stored in the memory 114. If the memory 114 contains, substitution, additional, or new configuration data, then the electronic device 100 can copy the configuration data from the memory 114 into its own memory 103 and operate according to the settings contained in the configuration data.

Figure 7:
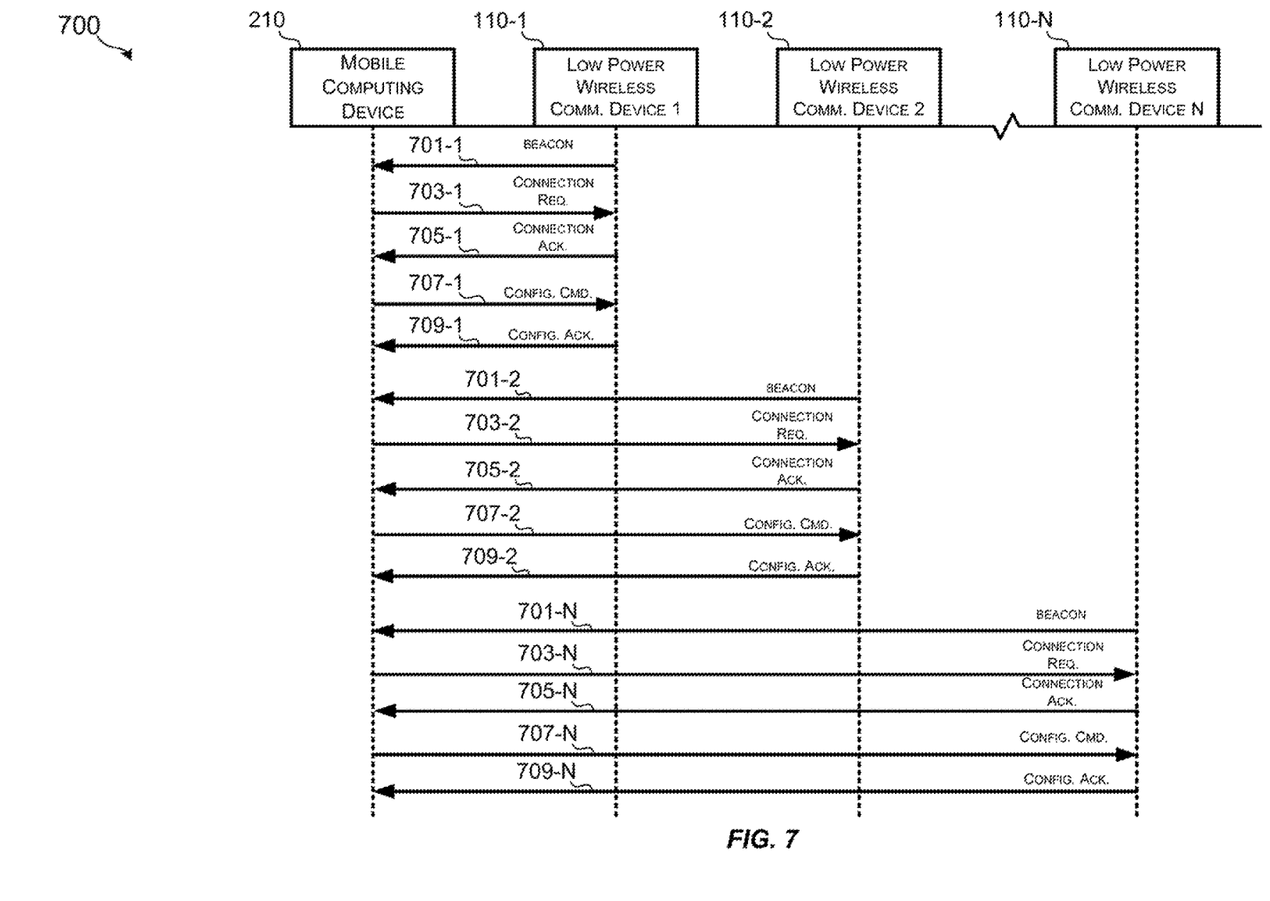
FIG. 7 illustrates an example data flow for tow power device configuration.

FIG. 7 is a data flow 700 of a process for configuring N electronic devices 100 using N corresponding low power wireless communication devices 110 and computing device 210. As shown, each of the N low power wireless communication devices 110 in a particular batch 205 can transmit a beacon signal 701. The mobile computing device 210 can detect the beacon signals 701, and in response establish corresponding low power wireless communication sessions with the transmitting low power wireless communication devices 110. In various example implementations, the low power wireless communication sessions can be established with each of the low power wireless communication devices 110 in series, one after the other. However, and other example implementations, the mobile computing device 210 can include functionality for establishing multiple low power wireless communication sessions with multiple low power wireless communication devices 110. In either such implementations, the mobile computing device can transmit a corresponding connection request signal 703 wirelessly to a corresponding low power wireless communication device 110 based on an identifier 115 included in the beacon signal. In response to the connection request 703, a low power wireless communication device 110 can transmit a low power wireless connection acknowledgment message 705. Successful exchange of the connection request 703 and connection acknowledgment 705 can establish a low power wireless communication session.

Once the low power wireless indication session is established, the mobile computing device 210 can transmit a configuration command 707 to a particular low power wireless communication device 110 participating in the low power wireless communication session. As described herein, the configuration command 707 can include configuration data, configuration settings, and various commands that the low power wireless communication devices 110 can use to store specific configuration settings specific to a group 205 of the electronic devices 100 for an individual electronic device 100.

When the low power wireless communication devices 110 have successfully processed the corresponding configuration command 707, they can respond with a corresponding configuration acknowledgment signal 709. Based on the configuration acknowledgment signal 709, the mobile computing device 210 can record which of the low power wireless communication devices 110 have been configured. In instances in which the mobile computing device 210 does not receive a configuration acknowledgment signal 709, the mobile computing device 210 can reattempt the steps represented by 701, 703, 705, and 707. Similarly, if the mobile computing device 210 does not receive a connection acknowledgment signal 705, it can reattempt the connection request 703 until a viable low power wireless communication session is established.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing device comprising:
   a processor; and
   a non-transitory computer readable medium coupled to the processor and comprising instructions that when executed by the processor cause the processor to:
   detect a low power beacon signal transmitted by a low power wireless communication device coupled to a primary electronic device;
   based on the low power beacon signal being detected, establish a communication session with the low power wireless communication device;
   send configuration data corresponding to a configuration setting of the primary electronic device to the low power wireless communication device, the low power wireless communication to store the configuration data separately from the primary electronic device;
   transmit a configuration command to the low power wireless communication device to change the low power beacon signal to indicate that the low power wireless communication device has received the configuration data; and
   generate a record of a confirmation message received from the low power wireless communication device.

2. The computing device of claim 1, wherein the instructions that cause the processor to establish the communication session with the low power wireless communication device further cause the processor to:
   transmit a low power wireless communication session request to the low power wireless communication device through a low power wireless transceiver;
   receive a low power wireless communication session acknowledgement from the low power wireless communication device through the low power wireless transceiver; and
   receive the confirmation message comprising a status indication of whether the configuration data was stored in the low power wireless communication device through the low power wireless transceiver.

3. The computing device of claim 2 wherein the low power wireless transceiver comprises a IEEE 802.11 low energy communication device.

4. The computing device of claim 1, wherein the instructions further cause the processor to transmit a configuration command to the low power wireless communication device to shut down following transmission of the configuration commands to change the low power beacon signals.

5. The computing device of claim 1, wherein the processor is to detect the low power beacon signal transmitted by the low power wireless communication device while the primary electronic device to which the low power wireless communication device is coupled is unpowered.

6. A method comprising:
   detecting, by a computing device, a plurality of low power beacon signals transmitted by a plurality of low power wireless communication devices, each of the plurality of low power wireless communication devices being coupled to a respective one of a plurality of corresponding primary electronic devices;
   for each low power beacon signal in the detected plurality of low power beacon signals,
   establishing, by the computing device, a respective communication session with each of the low power wireless communication devices from which the plurality of low power beacon signals were detected;
   sending, by the computing device, configuration data corresponding to a configuration setting for a primary electronic device in the plurality of corresponding primary electronic devices that are coupled to the low power wireless communication devices to which the respective communication sessions have been established;
   transmitting, by the computing device, configuration commands to the low power wireless communication devices to which the respective communication sessions have been established to change the low power beacon signals to indicate that the low power wireless communication devices have received the configuration data; and generating, by the computing device, a record of a confirmation message received from each of the low power wireless communication devices to which the respective communication sessions have been established.

7. The method of claim 6, wherein sending the configuration data establishing a respective communication session with each of the low power wireless communication devices from which the plurality of low power beacon signals were detected comprises:

transmitting a low power wireless communication session request to each of the plurality of low power wireless communication devices through a low power wireless transceiver coupled to the computing device;

receiving low power wireless communication session acknowledgements from the plurality of low power wireless communication devices through the low power wireless transceiver; and receiving, from each of the plurality of low power wireless communication devices, the confirmation message comprising a status indicator of whether the configuration data was stored in the low power wireless communication device through the low power wireless transceiver.

8. The method of claim 7, further comprising transmitting the low power wireless communication session request again when the status indicator indicates the configuration data was not successfully stored.

9. The method of claim 6, further comprising sending a completion message to a remote computing device comprising an indication of at least some of the plurality of low power wireless communication devices having returned a corresponding confirmation message.

10. The method of claim 6, further comprising transmitting configuration commands to the low power wireless communication devices to shut down following transmission of the configuration commands to change the low power beacon signals.

11. The method of claim 6, wherein establishing a respective communication session with each of the low power wireless communication devices from which the plurality of low power beacon signals were detected further comprises establishing the respective communication sessions while the primary electronic devices are unpowered.

12. A printer comprising:
a low power communication device comprising:
a controller;
a low power communication interface coupled to the controller; and
a non-transitory computer readable medium coupled to the controller and comprising first instructions, that when executed by the controller, cause the controller to:
transmit a low power beacon signal using the low power communication interface;
receive configuration data for the printer from a computing device through the low power communication interface, the configuration data corresponding to a configuration setting for the printer; and
store the configuration data in the non-transitory computer readable medium; and
a processor; and
a memory on which is stored second instructions that when executed by the processor, cause the processor to:
configure the printer using the configuration data stored in the low power communication device.

13. The printer of claim 12, wherein the first instructions further cause the controller to change the low power beacon signal in response to receiving the configuration data.

14. The printer of claim 13, wherein to change the low power beacon signal, the first instructions cause the controller to include a status indicator in the low power beacon signal indicating that the configuration data is stored in the non-transitory computer readable medium.

15. The printer of claim 12, wherein the configuration data in the computer readable medium is available to the printer for defining operations of the printer.

16. The printer of claim 12, wherein the low power communication device further comprises a battery for providing power to the controller to execute the instructions when the printer is unpowered.

17. The printer of claim 12, wherein the first instructions are further to cause the controller to transmit the low power beacon signal, to receive the configuration data, and to store the configuration data while the printer is not receiving electrical power.

18. The printer of claim 12, wherein the first instructions are further to cause the controller to include a status indicator in the low power beacon signal indicating whether the configuration data is stored in the non-transitory computer readable medium.

19. The printer of claim 12, wherein the first instructions are further to cause the controller to:
receive a configuration command to shut down from the computing device; and
shut down the low power wireless communication device based on receipt of the configuration command to shut down.

* * * * *

UNITED STATES PATENT AND TRADEMARK OFFICE
CERTIFICATE OF CORRECTION

PATENT NO. : 10,375,547 B2
APPLICATION NO. : 15/519623
DATED : August 6, 2019
INVENTOR(S) : David O Hamilton et al.

Page 1 of 1

It is certified that error appears in the above-identified patent and that said Letters Patent is hereby corrected as shown below:

On the Title Page

Item (73), Assignee, Line 2, delete "TN" and insert -- TX --, therefor.

In the Claims

In Column 10, Line 31, in Claim 3, delete "claim 2" and insert -- claim 2, --, therefor.

Signed and Sealed this
Seventeenth Day of December, 2019

Andrei Iancu
*Director of the United States Patent and Trademark Office*